United States Patent [19]  
Weber

[11] Patent Number: 4,924,348  
[45] Date of Patent: May 8, 1990

[54] CAPACITOR FOR CAPACITIVE MEASURING DEVICES

[76] Inventor: Hans R. Weber, 10, chemin du Grillon, CH-1007 Lausanne, Switzerland

[21] Appl. No.: 365,821

[22] Filed: Jun. 14, 1989

[30] Foreign Application Priority Data

Jun. 20, 1988 [CH] Switzerland .................. 2365/88

[51] Int. Cl.⁵ .................. G01N 25/64; H01G 7/00
[52] U.S. Cl. .................. 361/280; 73/336.5
[58] Field of Search ............... 361/280, 286; 73/336.5

[56] References Cited

U.S. PATENT DOCUMENTS 4,164,868 8/1979 Suntola ..................... 361/286 X

Primary Examiner—Donald A. Griffin
Attorney, Agent, or Firm—Sherman and Shalloway

[57] ABSTRACT

Capacitors with variable capacitance in capacitive measuring devices consist of at least one first element (2), which is provided with electrode areas (1), which by displacement of this element (2) of the capacitor relative to a second element (10) of said capacitor produce predetermined changes in capacitance. Ideally, connections to the electrode areas (1) are made from the front, i.e. not through the substrate (6), which is achieved by the fact that an insulating layer (4), over which conducting strips (3) run, is interrupted at the locations where an electrical contact has to be made between a given electrode area (1a) and the appropriate conducting strip (3a), such that at these contact points (5a) the electrode area (1a) and the conducting strip (3a) lie in direct contact with one other and are capable of conducting electricity. Over or in the same place as the conducting strips (3), if necessary essentially insulated electrically from the conducting strips (3) by an electrically insulating cover coating (7), electronic components can be placed on the capacitor element (2). The counter-electrode (10) is located on a carrier (12) such that the substrate (6) and/or the carrier forms at least part of the dielectric (13) of the capacitor.

11 Claims, 2 Drawing Sheets

CAPACITOR FOR CAPACITIVE MEASURING DEVICES

BACKGROUND OF THE INVENTION

1. Field Of The Invention:

The present invention relates to a capacitor for capacitive measuring devices with mutually displaceable capacitor elements for the purpose of varying the capacitance of the measuring device as a function of the relative position of the capacitor elements to one another, in which a first capacitor element (2) has patterned electrode areas consisting of individual electrode areas (1) which are applied to a substrate (6) and are electrically connected to one another in a predetermined manner by means of conducting strips (3), where the conducting strips (3) and the electrode areas (1) are located on the same side of the substrate (6) and where between the conducting strips (3) and the electrode areas (1) there is an insulating layer (4) which is interrupted at predetermined contact points (5) such that at these points an electrode area (1a) is electrically connected to a conducting strip (3a) and that a second capacitor element consists of a carrier (12) on which the counter-electrode or counter-electrodes (10) are mounted.

2. Description Of The Prior Art:

Capacitive measuring devices as used e.g. in linear transducers or rotary encoders which operate as electromechanical components to convert mechanical motion into electrical signals by using a variable capacitor are known. In practice, two types of such devices are distinguished, namely linear devices for measuring a linear distance or a linear displacement between an initial and a terminal position on the one hand and, on the other, rotary devices for measuring rotation or the angle between an initial and an angular position achieved after rotary motion. Although the two types of device serve different purposes, the technology described below and the present invention are completely applicable to both types. They also apply equally to all reciprocal configurations of electrodes, electrostatic screens, reflectors and dielectrics known to persons skilled in the art. In every case, the capacitor element experiences a defined change in capacitance per unit of motion, which is transmitted to an electronic measuring system to evaluate the distance travelled by the mechanical measuring element or the angle through which it has travelled. The resolution or graduation of the measurable differences in distance or angle of such capacitive measuring devices depends essentially on the fineness of the individual electrode surfaces, since the more densely these surfaces can be configured adjacent to one another at essentially right angles to the direction of motion of the mechanical measuring element, i.e. the smaller their extent perpendicular to the direction of motion, the smaller the distance to be travelled by the movable part (the counter-electrodes, screen, reflector or dielectric) of the capacitor, in order to produce a clearly defined capacitance change.

In view of the fact that the individual electrode areas have to be linked to one other, on the one hand, and with the electronic display and logic systems, on the other, each electrode area is provided with at least one contact point. Because of the configuration and geometry of the electrode areas, the contact between the individual patterned electrode areas is made from the rear of the capacitor by means of bores or apertures provided through the capacitor electrodes and the substrate bearing said elements, through which the electrode areas are contacted. The size of these bores or apertures not only affects the capacitance of each electrode area, in so far as they are in the active capacitor range, but also essentially defines the minimum dimensions of the electrode areas, since there are geometrical limits to these which must be observed, as a consequence of the mechanical processing. This means, however, that very tight limits apply to the resolution of the mechanical motion with reasonable electrical interpolation, since a relatively large mechanical movement is required to change the capacitance of the capacitive measuring device. It is evident that this will present disadvantages especially in precision measuring technology. There is a further disadvantage of conventional capacitor elements with patterned electrode areas, in that electrically conductive zones must be provided on both sides of a substrate; on the one side the electrode areas of the variable capacitor and on the other side the conducting strips and contact points.

In recent applications of capacitive measuring devices, capacitors with patterned electrode areas have been used in which the electrode areas located adjacent to one another in a bar pattern continue laterally in fine conducting strips, which are then covered with an insulating layer with a number of apertures, through which conducting strips disposed on the insulating layer and at right angles to the electrodes are electrically connected. One of the disadvantages of this embodiment of devices with such capacitor elements, as known in the art, is that it requires a large surface area relative to the effective electrode areas and is thus not well suited for miniaturisation.

SUMMARY OF THE INVENTION

The object of the present invention is to overcome the disadvantages of capacitors which are known in the art, of the type mentioned in the preamble with capacitor elements with patterned electrode areas, and to create a capacitor which noticeably improves the resolution of the distance or angles to be measured without having to increase the electrical interpolation unnecessarily and which can be mass-produced more easily and more cheaply than previous types. A further purpose of the invention is to enable the construction of an advantageous capacitor of minimum surface area and volume which can exploit the advantages of miniaturisation to the full and be installed as an integral component in the measuring device.

The invention solves this task by providing a capacitor for capacitive measuring devices with mutually displaceable capacitor elements for the purpose of varying the capacitance of the measuring device as a function of the relative position of the capacitor elements to one another, in which a first capacitor element has patterned electrode areas consisting of individual electrode areas which are applied to a substrate and are electrically connected to one another in a predetermined manner by means of conducting strips, where the conducting strips and the electrode areas are located on the same side of the substrate and where between the conducting strips and the electrode areas there is an insulating layer which is interrupted at predetermined contact points such that at these points an electrode area is electrically connected to a conducting strip and that a second capacitor element consists of a carrier on which the counter-electrode or counter-electrodes are mounted, wherein the substrate and/or the carrier form at least part of the dielectric of the capacitor.

BRIEF DESCRIPTION OF THE DRAWING FIGURES

Advantageous embodiments of the capacitor in accordance with the invention and also of the capacitor element with patterned electrode areas contained in it are described in detail with the aid of drawings. It should be noted that neither the structure nor the operation of the capacitive measuring device are the subject of the present invention, since they have been known in the art for long enough and are described in the following patents, among others: CH-A-643 652, CH-A-539 837, CH- A-648 929, US-A-3 961 318, US-A-4 420 754 and US-A-4 586 260. For this reason, no further details of these elements are discussed. The drawings show the following:

FIG. 1 shows a plan of a linear capacitor element with patterned electrode areas as used advantageously in the capacitor according to the invention, on a greatly enlarged scale, without a covering layer, FIG. 2 shows a cross-section through the capacitor element as per FIG. 1 along the line A-A, in the region of a contact-free junction of an electrode area and a conducting strip, on an even more enlarged scale, FIG. 3 shows a cross-section through the capacitor element as per FIG. 1 along the line B-B, in the region of a contact point between an electrode area and a conducting strip, on the same scale as used in FIG. 2, FIGS. 4 to 11 show cross-sections through a plurality of capacitors in accordance with the invention which contain the previously described capacitor element with electrode areas and conducting strips as per FIG. 1, FIG. 12 shows an example of a linear measuring device element encompassing a capacitor element with patterned electrode areas and conducting strips, as can be contained in the capacitor in accordance with the invention, and FIG. 13 shows a plurality of measuring device elements produced simultaneously and on one side of a common substrate in accordance with FIG. 12.

DETAILED DESCRIPTION OF THE INVENTION

Figure 1:
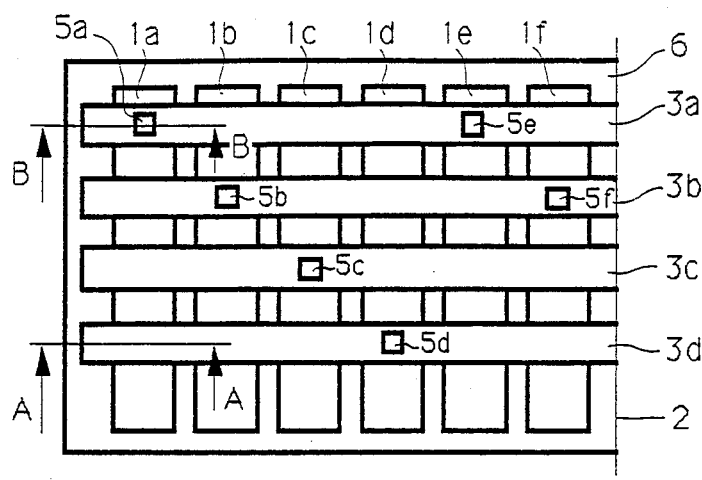
Figure 2:
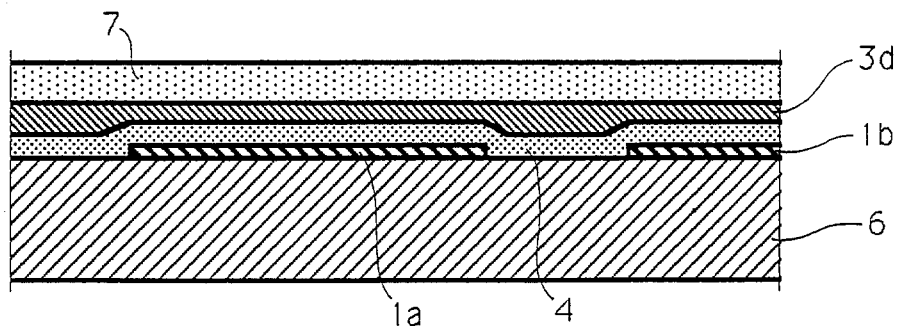

In FIG. 1, it is apparent that the electrode areas 1 are located closely adjacent and parallel to one other on a capacitor element 2 of the capacitor according to the invention forming the capacitive element of the measuring device, while conducting strips 3 run at right angles to them. As can be seen from FIGS. 2 and 3, an insulating layer 4 is disposed between the plane of the electrode areas 1 and that of the conducting strips 3, which prevents the electrode areas 1a-1f from being generally connected to one another by means of conducting strips 3a-3d. This may only occur at specially designated contact points 5, in order to produce the frequently repeating electrode patterns, or their regular linkages, which are provided in order that when the electrodes and counter-electrode(s) of a capacitor, screen, reflector or dielectric are mutually displaced, capacitance variations are generated to which the logic electronics can assign defined values.

Figure 3:
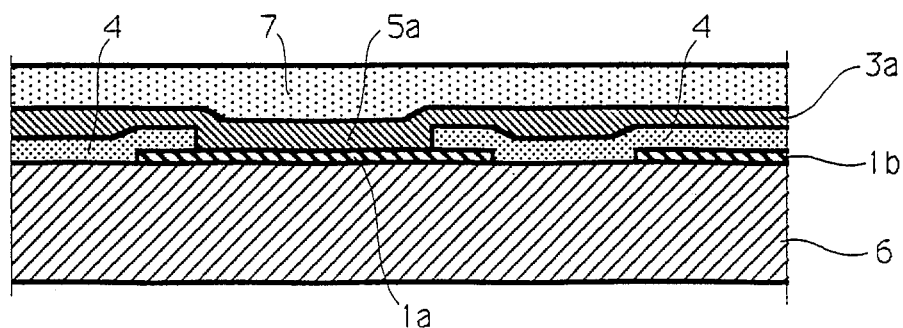

In FIG. 3 it can be seen that the contact points 5 can be made by not providing the insulating layer 4 locally over the electrode areas 1, or by interrupting said layer such that at these points the conducting strip 3 disposed on the insulating layer 4 comes to rest directly on the electrode area 1 with the result that at this location an electrical connection is formed between the relevant electrode area 1, in this case electrode area 1a, and the relevant conducting strip 3, in this case conducting strip 3a.

As a result, in the capacitor element 2, as described, with patterned electrode areas, no mechanical treatment is required to make contact between the electrode areas 1 and the conducting strips 3. An advantageous manufacturing method is to produce capacitor elements 2 with patterned electrode areas such that in the first stage the electrode areas 1 are applied to a substrate 6, which can be either a rigid or a flexible substrate, followed by the insulating layer 4, on to which the conducting strips 3 are laid. The individual layers 1, 4 and 3 and, if required, an electrically insulating cover coating 7 to protect against mechanical damage, can be applied successively to the substrate 6, using processes known in the art, as commonly used in semi-conductor and thin film technology, ideally utilising photographic or similar masks. It is therefore possible to manufacture capacitor elements 2 with patterned electrode areas on an industrial scale both economically and with a high degree of precision by means of planar processes. Since no minimum dimensions are required of the contact points 5 for mechanical reasons, the electrode areas 1 can be configured extremely narrowly, such that by comparison with conventional patterned electrode areas, a multiplicity of individual electrode areas 1 per unit of length can be arranged at essentially right angles to the direction of motion. In the production of capacitor elements 2 as described, it is the photographic resolution or reproduction and not, as hitherto, the mechanical fineness of the contact points 5 which determines the fineness of the electrode areas 1 and thus the resolution of the mechanical motion into increments of distance or angle.

The capacitor element 2 with electrode areas 1 as described above can not only be manufactured more easily and economically in planar processes than the capacitor elements of this type which have been usual hitherto, which require twosided treatment, but also makes it possible to achieve a considerable refinement in the measurement of mechanical quantities, such as distances or angles.

Within the scope of the present invention, advantageous capacitor elements 2 of this kind are to be used to produce capacitors in accordance with the invention which fully exploit one-sided production technology for the capacitor elements 2, offer high resolution with minimum surface area and an optimum manufacturing process, and which can be manufactured as integral elements of the measuring device together with at least one component of said measuring device.

FIGS. 4 to 11 show cross-sections of particularly advantageous embodiments of the capacitor which is the subject of the invention, although it should be noted that, for the purposes of clarity, the insulation layer 4 and the conducting strips 3 above the electrode areas 1, 1a and 1b have been omitted.

Figure 4:
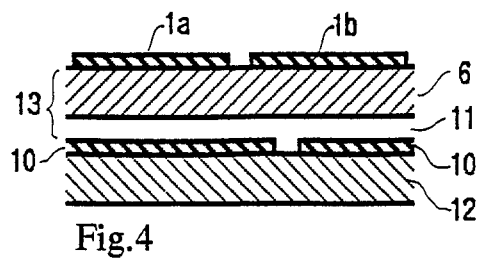
Figure 5:
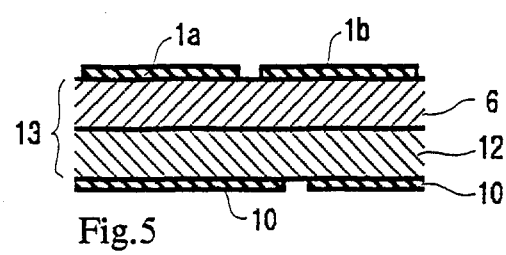

FIG. 4 illustrates an embodiment of the capacitor according to the invention in which the dielectric 13 consists of the substrate 6 and an air gap 11 located between the counter-electrodes 10 on a carrier 12 and the substrate 6. The difference in the embodiment of the capacitor according to the invention as shown in FIG.

5 is that the carrier 12 is directly flush with the substrate 6, and the counter-electrodes 10 are located on its rear, such that the dielectric 13 consists of the substrate 6 and the carrier 12.

Figure 6:
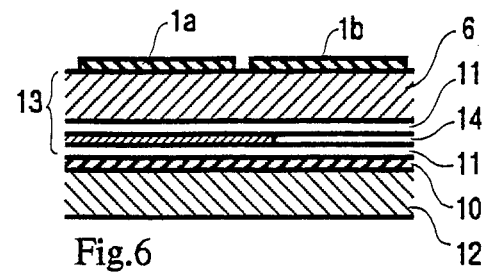
Figure 7:
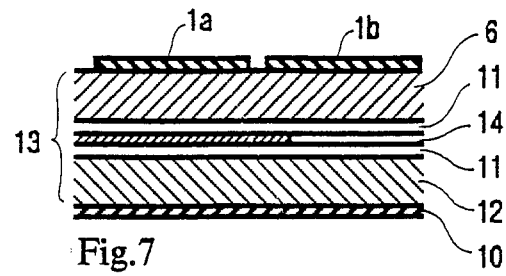

FIGS. 6 and 7 illustrate two further embodiments of capacitors in accordance with the invention, containing an electrostatic screen 14. In the case of the capacitor according to FIG. 6, the electrostatic screen 14, which consists of a conductive material and is advantageously provided with cyclic apertures, is located in an air gap 11 and is advantageously displaceable between the counter-electrode 10 and the substrate 6 which bears the electrodes 1, such that the dielectric 13 consists of the substrate 6, the air gap 11 and the screen 14. In the case of the embodiment according to FIG. 7, the carrier 12 bearing the counter-electrode 10 is rotated such that the counter-electrode 10 is on its underside and therefore the dielectric 13 consists of the substrate 6, the air gap 11 and the carrier 12. The screen 14 is located in the air gap 11.

In place of the screen 14 made of conductive material with apertures, a layer consisting of a dielectric material, for example plastic, can be used on which an electrically conductive screen pattern is formed, for example by sputtering or printing.

Figure 8:
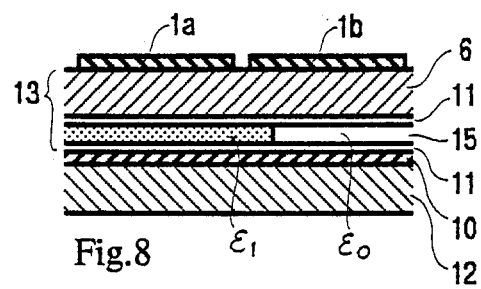
Figure 9:
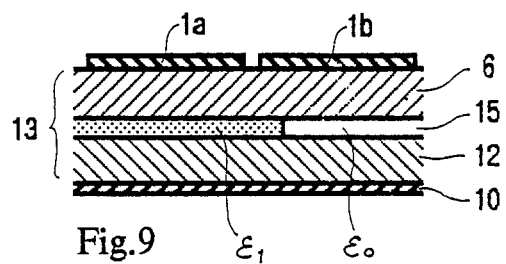

FIGS. 8 and 9 illustrate other advantageous embodiments of a capacitor according to the invention, in which an intermediate layer 15, consisting of a dielectric material with apertures, which material can advantageously be displaced, is inserted in place of an electrically conductive screen. The intermediate layer 15 has a dielectric constant $\epsilon_1$ which is different from the dielectric constant $\epsilon_0$ of the air-filled apertures. In the capacitor according to FIG. 8, the dielectric 13 consists of the substrate 6, the intermediate layer 15 with apertures and the air gap 11. In the capacitor according to FIG. 9, the carrier 12 is configured such that the dielectric 13 consists of the substrate 6, the intermediate layer 15 with apertures, the carrier 12 and, if required, an additional air gap, which is not shown here.

Figure 10:
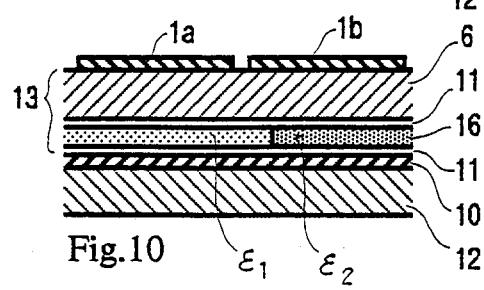
Figure 11:
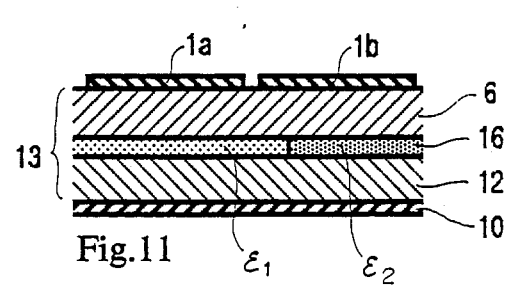

In the case of the embodiment as shown in FIGS. 10 and 11 of a capacitor in accordance with the invention, the intermediate layer 15 with apertures has been replaced by an advantageously displaceable intermediate layer 16 consisting of materials exhibiting different dielectric constants $\epsilon_1$ and $\epsilon_2$. This, too, can be configured without an air gap or with an air gap 11. In the embodiment as shown in FIG. 10 of the capacitor in accordance with the invention, in which the counter-electrode 10 is located on the side of the carrier 12 facing the intermediate layer 16, it is advisable to locate the intermediate layer 16 in an air gap 11 in order to avoid mechanical contact with the counter-electrode 10, such that in this case the dielectric 13 consists of the substrate 6, the air gap 11 and the intermediate layer 16. In FIG. 11, the carrier 12 is rotated such that the counter-electrode 10 is on its underside and the dielectric 13 consists of the substrate 6, the intermediate layer 16 and the carrier 12.

Figure 12:
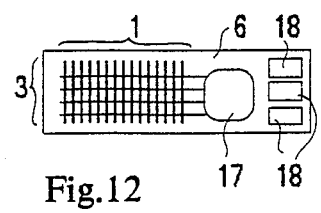

FIG. 12 illustrates that the capacitor according to the invention makes it possible for electronic components 17 and other parts 18 of the measuring device to be placed on the same side of the substrate 6 as the electrode areas 1 and the contact strip 3, such that the capacitor according to the invention is not a discrete component within the measuring device but forms an integral part of it, which can be manufactured at the same time as circuit components, using the same technology as used in the manufacture of the electronic systems of the measuring device.

Figure 13:
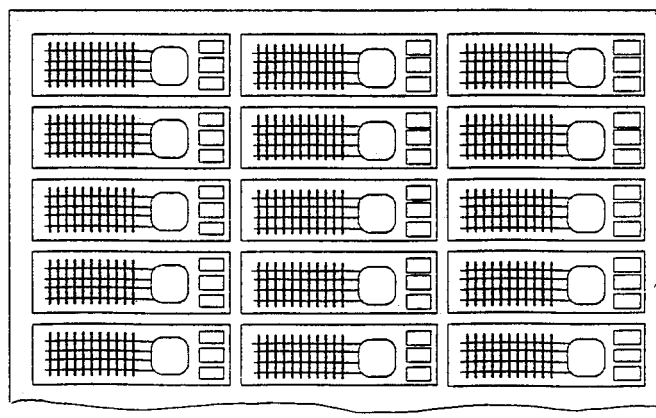

FIG. 13, for its part, makes it clear that a multiplicity of both capacitor elements 2 and electronic components 17, 18 of the measuring device can be manufactured simultaneously on one and the same substrate 6 before they are then separated in a single mechanical processing stage as is known in the art.

Furthermore, the capacitor elements 2 as described with electrode areas 1 also permit the construction of further advantageous and space-saving capacitors, in which individual components of the capacitor and individual elements of the measuring device's logic electronics can be located directly on the capacitor element on the same side of the substrate 6 as the electrode area and conductive, insulation and cover layers, above the electrode areas. In this way, the capacitor can be firmly integrated into the electronic circuits as a capacitive measuring element in the capacitive measuring device - or, if required, in other electronic circuits - or parts of the electronic circuits can be manufactured as a single component with the capacitor element. A solid mechanical stabiliser can be provided over the electronic components, which are applied or provided using technology known in the art, for the purposes of reinforcing and stiffening the capacitor element with the electrode areas.

A person who is skilled in the art will easily recognise that it is also perfectly feasible, following on from the linear patterns of electrode areas described hitherto, to configure the electrode areas 1 in a circle, in order to produce a circular capacitor element and thus a circular capacitor which is suitable for use in a capacitive measuring device for measuring angles where high resolution is required.

It is selfevident that, depending on the application and the required measurement resolution, electrode area patterns other than the rectangular or, in the case of a circular capacitor, circular-section forms described hitherto can be used. It is also possible to provide different arrangements of the conducting strips.

Processes known in the art for the manufacture of electronic circuits can be employed in the manufacture of the capacitor according to the invention or its capacitor element 2 with integral electronics. Planar processes are particularly suitable, since the capacitor element 2 bearing the electrode areas 1 is built up in layers including the electronic components 17, 18 on one side of a substrate 6. If a flexible substrate 6 is used, a stabiliser, which is ideally applied as the final layer, guarantees the evenness of the capacitor element 2 which is important for ensuring errorfree measuring. If a substrate 6 made, for example, of silicon is used, in and on which the electrode areas 1 and conducting strips 3, or insulating materials 4, 7 are arrayed by means of the usual coating, etching and doping processes used in the semiconductor industry for making selected zones conductive or for insulating them, the primary aim of a stabiliser is to protect the capacitor element 2 against mechanical damage.

A flexible substrate 6 can be run from the electrode area 1 in any direction, together with the conducting strips 3 to a location where there is space to accommodate the electronic components 17, 18.

A person skilled in the art will recognise that in the embodiments of the capacitor according to the invention described hitherto, the counter-electrode or counter-electrodes 10 or an electrostatic screen 14 which can be displaced relative to the electrode areas 1, or alternatively a dielectric intermediate layer 15, 16 or a reflector - not illustrated hitherto - of a capacitor constructed in such a way, with integral electronic circuits, is located on the rear of the substrate 6 with the electrode areas 1, in complete contrast to the common practice to date, such that the substrate 6 forms at least part of the dielectric 13 of the capacitor.

Alternatively, it is, of course, also possible to locate the carrier 12 over the electrode areas 1 relative to the substrate 6 in such a way that the dielectric contains the carrier 12 instead of the substrate 6 in addition to, if required, an air gap and a screen or reflector. Compared with a capacitor whose dielectric consists of air and, if required, a screen or reflector, the consequence of including the substrate 6 and/or the carrier 12 in the dielectric is that for the same electrode separation, the capacitance is increased, or that for the same capacitance the electrode separation can be made larger.

I claim:

1. A capacitor for capacitive measuring devices with mutually displaceable capacitor elements for the purpose of varying the capacitance of the measuring device as a function of the relative position of the capacitor elements to one another, in which a first capacitor element (2) has patterned electrode areas consisting of individual electrode areas (1) which are applied to a substrate (6) and are electrically connected to one another in a predetermined manner by means of conducting strips (3), where the conducting strips (3) and the electrode areas (1) are located on the same side of the substrate (6) and where between the conducting strips (3) and the electrode areas (1) there is an insulating layer (4) which is interrupted at predetermined contact points (5) such that at these points an electrode area (1a) is electrically connected to a conducting strip (3a) and that a second capacitor element consists of a carrier (12) on which the counter-electrode or counterelectrodes (10) are mounted, wherein the substrate (6) and/or the carrier (12) form at least part of the dielectric (13) of the capacitor.

2. A capacitor as in claim 1, characterised in that the substrate (6) is made of rigid or flexible material on which the electrode areas (1), the insulating layer (4) and the conducting strips (3) are applied successively by means of planar processes such as sputtering, printing, etching or engraving.

3. A capacitor as in claim 1, characterised in that it is linked in a single element with electronic components (17, 18) which are built up in layers on the same side of the substrate (6) as the electrode areas (1).

4. A capacitor as in claim 1, characterised in that at least some electronic components are located above the electrode areas (1) and the conducting strips (3) on the same side of the substrate (6).

5. A capacitor as in claim 1, characterised in that the dielectric (13) consists of the substrate (6) and the air gap (11).

6. A capacitor as in claim 1, characterised in that the dielectric (13) consists of the substrate (6) and the carrier (12).

7. A capacitor as in claim 5 or 6, characterised in that the dielectric (13) also includes a screen (14) or an intermediate layer (15, 16).

8. A capacitor as in claim 7, characterised in that the intermediate layer (15, 16) consists of a dielectric material with apertures or a material with different dielectric constants.

9. A capacitor as in claim 7, characterised in that the screen consists of a dielectric material with a selectively applied conductive layer.

10. A capacitor as in claim 1, characterised in that the substrate (6) is made of silicon, in or on which the electrode areas (1) are integrated.

11. A capacitor as in claims 4 and 10, characterised in that the electronic components are integrated on the substrate (6).

* * * * *